(12) United States Patent
Christenbury et al.

(10) Patent No.: US 11,648,801 B2
(45) Date of Patent: May 16, 2023

(54) NON-PNEUMATIC WHEEL

(71) Applicant: Compagnie Generale des Etablissements Michelin, Clermont-Ferrand (FR)

(72) Inventors: Damon Lee Christenbury, Greenville, SC (US); Steven M Cron, Simpsonville, SC (US); Ryan Michael Gaylo, Simpsonville, SC (US); Timothy Brett Rhyne, Greenville, SC (US)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 611 days.

(21) Appl. No.: 16/628,845

(22) PCT Filed: Jul. 6, 2018

(86) PCT No.: PCT/US2018/041113
§ 371 (c)(1),
(2) Date: Jan. 6, 2020

(87) PCT Pub. No.: WO2019/010432
PCT Pub. Date: Jan. 10, 2019

(65) Prior Publication Data
US 2020/0223249 A1 Jul. 16, 2020

Related U.S. Application Data

(60) Provisional application No. 62/529,456, filed on Jul. 6, 2017.

(51) Int. Cl.
| | | |
|---|---|---|
| *B60C 7/14* | (2006.01) | |
| *B60B 9/04* | (2006.01) | |
| *B60B 9/26* | (2006.01) | |

(52) U.S. Cl.
CPC ................ *B60C 7/146* (2021.08); *B60B 9/04* (2013.01); *B60B 9/26* (2013.01); *B60C 7/14* (2013.01)

(58) Field of Classification Search
CPC .... B60B 9/04; B60B 9/26; B60C 7/14; B60C 7/146
See application file for complete search history.

(56) References Cited

U.S. PATENT DOCUMENTS

| | | | |
|---|---|---|---|
| 1,086,333 A | 2/1914 | Russell | |
| 4,553,577 A * | 11/1985 | Gregg | B60B 9/26 152/80 |
| 5,685,926 A | 11/1997 | Kejha | |
| 6,286,572 B1 | 9/2001 | Chen | |
| 7,013,039 B2 | 3/2006 | Rhyne | |

(Continued)

OTHER PUBLICATIONS

European Patent Office; International Search Report and Written Opinion for patent application PCT/US2018/041113; dated Oct. 4, 2018; Publisher: European Patent Office, Rijswijk, Netherlands, pp. 1-12, enclosed.

*Primary Examiner* — Kip T Kotter
(74) *Attorney, Agent, or Firm* — John Steckler Schwab

(57) ABSTRACT

A non-pneumatic wheel having spokes that are constructed such that collectively the plurality of spokes exhibit a fractional radial stiffness value within a range of 1 N/mm/deg to 10 N/mm/deg and a non-linearity of less than 20% when deflected under normal loading conditions.

16 Claims, 5 Drawing Sheets

(56) References Cited

U.S. PATENT DOCUMENTS

| | | |
|---|---|---|
| 7,013,939 B2 | 3/2006 | White |
| 8,215,750 B2 * | 7/2012 | Hino ................ B41J 2/1645 |
| | | 347/47 |
| 2001/0030402 A1 | 10/2001 | White |
| 2003/0024383 A1 | 2/2003 | Roberts et al. |
| 2007/0089820 A1 | 4/2007 | Gabrys et al. |
| 2008/0314486 A1 | 12/2008 | Manesh |
| 2009/0211675 A1 | 8/2009 | Louden |
| 2009/0294000 A1 * | 12/2009 | Cron ................ B60C 7/18 |
| | | 152/5 |
| 2010/0018621 A1 | 1/2010 | Thompson |
| 2010/0200131 A1 | 8/2010 | Iwase |
| 2011/0248554 A1 | 10/2011 | Chon |
| 2012/0205017 A1 | 8/2012 | Endicott |
| 2015/0174953 A1 | 6/2015 | Cron |
| 2015/0251493 A1 | 9/2015 | Ma |
| 2016/0167434 A1 | 6/2016 | Nishida |
| 2017/0113491 A1 | 4/2017 | Iwamura et al. |

* cited by examiner

NON-PNEUMATIC WHEEL

FIELD

The subject matter relates to a non-pneumatic wheel having a spoke having an individual stiffness of low non-linearity over the normal loading conditions of the wheel.

BACKGROUND

Non-pneumatic wheels provide advantages in wheel performance without relying upon a gas inflation pressure for support of the loads applied to the wheel.

In one example of a non-pneumatic wheel, a compliant band with a ground contacting portion can be connected with a plurality of tension-transmitting, web-like elements (also referred to as "spokes") extending radially from a center element or hub. By way of example, such non-pneumatic wheel may be formed by open cast molding in which a material such as e.g., polyurethane is poured into a mold that forms all or part of the non-pneumatic wheel. Alternatively the spokes may be formed individually then attached to the outer band and hub.

Tension of the spokes is countered by circumferential compression in the outer band of the wheel. The greater the tension of the spokes, the greater the circumferential compression. Uniform spoke tension may be created by a uniform pull of each of the spokes. When the wheel is placed under load, such as when it is supporting weight of a vehicle, a portion of the load is carried through circumferential compression forces in the outer band in the circumferential direction to the top of the outer band. The spokes at the top of the wheel carry a larger amount of tension which is proportional to the load applied to the wheel. This load carrying mechanism is similar to how the radial cords of pneumatic wheels carry a significant portion of the load of the vehicle in tension on the top of the wheel and are generally referred to as a "top loading wheels."

Bottom loading wheels, such as solid wheels, semi-solid wheels, foam filled wheels or spring wheels, carry a predominant portion of the load in compression against the hub of the wheel.

When a wheel encounters an obstacle, such as may be encountered by a wheel rolling over a surface that is not smooth or when encountering an obstacle, such as a rock, crack, pothole, or curb, the outer band is momentarily displaced and the spokes are momentarily deformed beyond the amount of deformation due to deflection of the outer band in the contact patch. If the spokes have a high stiffness rate, the deformation caused by the obstacle creates a larger load transmitted to the vehicle than if the spokes have a low stiffness rate. The momentary high load created by the obstacle is perceived by the vehicle, and the operator thereof, as noise, vibration, shock, and or impulse, herein referred to as "intrusivity" with increasing intrusivity being associated with increasing noise, and or vibration etc.

Generally, spoke stiffness increases as the spoke is extended. The slope of the stiffness of the spoke compared to the displacement of the spoke will indicate the wheels response to momentary displacements from encountering an obstacle. The greater the slope, the greater the force created as the spoke is displaced while the spoke having a smaller stiffness-displacement slope will exert less force to the vehicle when the wheel encounters a momentary displacement.

For a given spoke geometry, spokes constructed of a high modulus material will be stiffer than spokes having a low modulus material. Construction of spokes in traditional non-pneumatic wheels from a low modulus material creates non-pneumatic wheel spokes having the ability to absorb shock, vibration and reduce noise and impulse forces. Construction of spokes in traditional non-pneumatic wheels from high modulus materials creates non-pneumatic wheel spokes having stiffer response and a generally higher intrusivity.

Using materials having a low modulus to create non-pneumatic wheels having low intrusivity require spokes having an actual length (the "actual length" being the distance following the curves of the spoke) which is close to the effective length (the "effective length" being the distance between the attachment point of the spoke at the hub and the attachment point of the spoke at the outer band) of the spoke such that the spokes of the wheel are stretched to achieve the appropriate stiffness rate. To reduce the intrusivity of the wheel, the spokes may be lengthened by lengthening the effective length until the desired stiffness rate is achieved. The effective length, however, is limited by the distance between the hub and the outer band, and in effect is a limiting factor for the reduction of intrusivity in the design of a non-pneumatic wheel. Complicating the design of the spokes is that while a minimum stiffness is needed in the spokes to support the weight of the vehicle, the stiffness rate of the loaded wheel increases quickly as the spokes are stretched to support the load. This results in spokes that, although are designed to have a low stiffness, when loaded, have a high stiffness rate, particularly when accommodating larger momentary displacements.

Accordingly, a spoke structure that has a stiffness rate that is sufficiently low to reduce noise, vibration and impulses would be useful. A spoke structure that also minimizes the effective length needed to achieve a reduction of noise, vibration, shock and or impulses would be helpful. A spoke structure that has a generally linear stiffness rate would be particularly useful.

SUMMARY

Aspects and advantages will be set forth in part in the following description, or may be obvious from the description, or may be learned through practice.

In one exemplary embodiment, a non-pneumatic wheel having a plurality of spokes having a nearly linear stiffness when deflected radially over a displacement equal to the deflection of the wheel's contact patch when loaded under normal operating conditions.

In one exemplary embodiment, a non-pneumatic wheel having a plurality of spokes having a v-shaped geometry such that each spoke has a nearly linear stiffness when deflected radially over a displacement equal to the deflection of the wheel's contact patch when loaded under normal operating conditions.

In one exemplary embodiment, a non-pneumatic wheel having a plurality of spokes having a v-shaped geometry such that each spoke has a nearly linear stiffness when deflected radially over a displacement equal to the deflection of the wheel's contact patch when loaded under normal operating conditions. Each spoke nesting with the adjacent spoke such that the nose of the spoke extends past a straight line drawn between the connection point of the adjacent spoke with the hub and the connection point of the adjacent spoke with the outer band.

A non-pneumatic wheel defining an axis of rotation and defining an axial direction, a radial direction, and a circumferential direction, the non-pneumatic wheel having an outer band, an outer surface of the outer band having a ground contacting surface; wherein the outer band forms a contact patch under a normal static loading condition; a hub; and a plurality of spokes; wherein the non-pneumatic wheel provides an average contact pressure equal to a value in the range of 2 to 4 bar; wherein each spoke is constructed such that collectively the plurality of spokes exhibit a fractional radial stiffness value within a range of 1 N/mm/deg to 10 N/mm/deg and a non-linearity of less than 20% when deflected under normal loading conditions. The amount the spoke is deflected is measured by the change of distance from the connection point of the spoke to the hub to the connection point of the spoke with the outer band when the spoke is located at the top of the wheel compared to when the spoke is located in the middle of the contact patch when the tire is under load. It is understood that embodiments for other applications, such as for agricultural tires, the contact pressure may be lower, or for applications such as trucks or earth mover tires, the contact pressure may be higher.

These and other features, aspects and advantages will become better understood with reference to the following description and appended claims. The accompanying drawings, which are incorporated in and constitute a part of this specification, illustrate embodiments and, together with the description, serve to explain the principles of the invention.

BRIEF DESCRIPTION OF THE DRAWINGS

A full and enabling disclosure, including the best mode thereof, directed to one of ordinary skill in the art, is set forth in the specification, which makes reference to the appended figures, in which.

The use of identical or similar reference numerals in different figures denotes identical or similar features.

DETAILED DESCRIPTION

Figure 1:
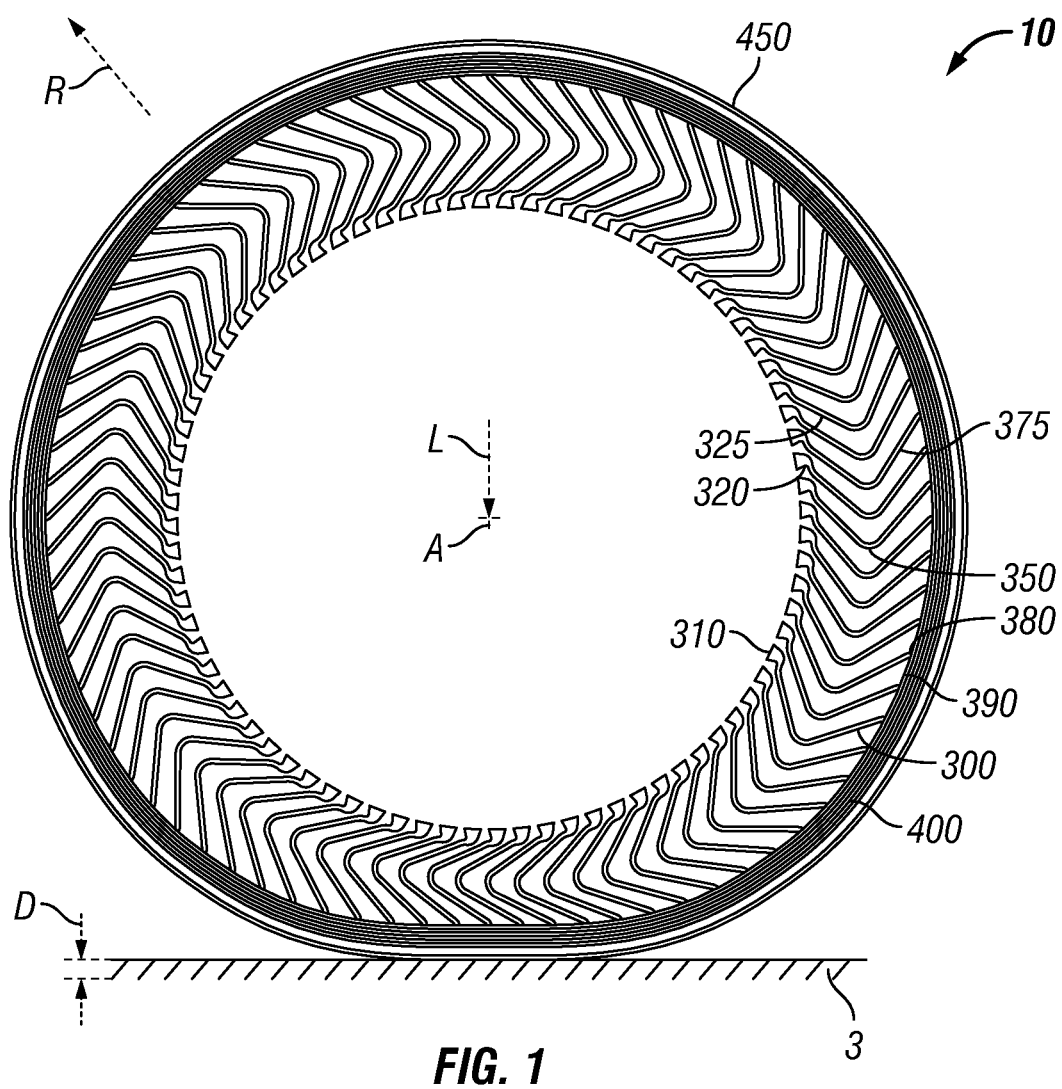
FIG. 1 provides a side view of an embodiment of the outer portion of non-pneumatic wheel having a high degree of spoke curvature.

The present disclosure provides a spoke for a non-pneumatic wheel that provides a desired overall wheel stiffness with a low individual spoke stiffness over a range of displacements experienced by the spoke as the wheel rolls under normal loading conditions. For purposes of describing embodiments, reference now will be made in detail to embodiments and/or methods, one or more examples of which are illustrated in or with the drawings. Each example is provided by way of explanation, not limitation of the invention. In fact, it will be apparent to those skilled in the art that various modifications and variations can be made in the present embodiments without departing from the scope or spirit of the invention. For instance, features or steps illustrated or described as part of one embodiment, can be used with another embodiment or steps to yield a still further embodiments or methods. Thus, it is intended that the present invention covers such modifications and variations as come within the scope of the appended claims and their equivalents.

The following terms are defined as follows for this disclosure:

"Axial direction" or the letter "A" in the figures refers to a direction parallel to the axis of rotation of for example, the outer band and/or wheel as it travels along a road surface.

"Radial direction" or the letter "R" in the figures refers to a direction that is orthogonal to the axial direction and extends in the same direction as any radius that extends orthogonally from the axial direction.

"Equatorial plane" means a plane that passes perpendicular to the axis of rotation and bisects the outer band and/or wheel structure.

"Radial plane" means a plane that passes perpendicular to the equatorial plane and through the axis of rotation of the wheel.

"Delta stiffness" means the slope of the line drawn on a plot of force over displacement, with the slope measured from a position where the object is unstressed and exerting no force, to the position where the object is exerting the force from which the stiffness is calculated by dividing the force by the displacement. For example, the delta stiffness of a spoke would be measured by measuring the change in force ($dF$) exerted by a spoke after being displaced from a first position to a second position ($dD$) such that delta stiffness=$dF/dD$ such that the delta stiffness is measured between two distinct displacements, or between an unloaded state, and a loaded state, if not otherwise specified.

"Tangent stiffness" means the slope of the line drawn on a plot of force over displacement where the slope is measured by the change in force divided by the change in displacement. In other words, the tangent slope is the slope of a straight line that is drawn tangent to a line drawn of a plot of force over displacement for the object at a given location on the force over displacement line. For example, the tangent stiffness of a spoke would be measured by measuring the change in force ($dF$) at a given displacement (D) over a very small change in displacement ($dD$) such that tangent stiffness for a given displacement=$dF/dD$ as $dD \to 0$.

"Linear stiffness" refers to a linear stiffness rate over a given distance of the object, such as the spoke or wheel structure, such that the stiffness increases or decreases in a generally linear fashion within a given deviation.

"Maximum loading conditions" refers to the conditions, such as the force transmitted through the wheel at the maximum load capacity marked on the wheel. If the wheel is not marked with the maximum load capacity, the "maximum loading conditions" refers to the conditions, such as force transmitted through the wheel at the maximum load capacity specified by the manufacturer. If the manufacturer does not specify a maximum load capacity, the "maximum loading conditions" refers to the conditions, such as the force transmitted through the wheel, just immediately prior to when the wheel is displaced vertically against a flat surface a minimum distance sufficient for a spoke to contact an adjacent spoke.

"Normal loading conditions" refers to the conditions, such as the force transmitted through the wheel, at the normal load capacity specified by the wheel manufacturer. If the wheel manufacturer does not specify a normal loading condition, "normal loading conditions" refers to the conditions, such as the force transmitted through the wheel, at a load of 85% of the value of the maximum loading condition unless otherwise defined herein.

"Average contact pressure" is calculated by the total load exerted on the wheel by the vehicle measured in a static state on a flat surface divided by the area within the outer perimeter of the contact patch.

"Fractional stiffness" is calculated by adding together the stiffness of each spoke and dividing by 360 degrees, where the stiffness of each spoke is calculated by measuring a first force $F_1$ exerted when the spoke is displaced a first displacement $D_1$ equal to that when it is at the center of the contact patch under normal loading conditions, measuring a second force $F_2$ exerted when the spoke is displaced a second displacement $D_2$ equal to that when it is in position at 180 degrees from the center of the contact patch under normal loading conditions, wherein the stiffness of each spoke is equal to $(F_1-F_2)/(D_1-D_2)$ for each spoke.

"Nonlinearity" is calculated by plotting the force exerted by each spoke against the displacement of each spoke over a plurality of displacement values from the first displacement $D_1$ to the second displacement $D_2$, plotting a first line between the first displacement, second force value coordinate $(D_1, F_1)$ and the second displacement, second force value coordinate $(D_2, F_2)$ and measuring the maximum deviation of force ($DF_{max}$) from the first line for any given value along the force ordinate, the nonlinearity represented as a percentage, the ratio of ($DF_{max}/(F1-F2)$).

FIG. 1 provides a side view of an embodiment of the outer portion of non-pneumatic wheel having a curved spoke structure that nest with each adjacent spoke. The wheel 10 shown here is resting on a surface 3. A load L is applied to the hub of the wheel, which could represent the weight, or a portion thereof, of the vehicle. When the load L is applied, the wheel is pressed against the surface 3 and the outer band deflects a distance D as the center of the hub A is fixed in space. The area of contact is referred to as the "contact patch" and provides an area over which the wheel interfaces and reacts with the surface on which it travels.

When viewed from the axial side of the wheel, the present embodiment spoke 300 possess a V-shaped geometry. The spoke allows for a nearly linear stiffness curve when deflected radially over a distance approximately equal to the wheel's vertical deflection D. This results in comparatively lower force transmission through the wheel during a dynamic loading event, such as when the wheel 10 encounters an obstacle such as a crack, rock or curb in the surface 3 such as might be found in a road, than with non-pneumatic wheels having spokes possessing stiffness profile having a nonlinearity of greater than 25%.

The V-shaped geometry of the spoke 300 begins at the attachment point 380 of the spoke to the outer band 400. A radially outer portion 375 of the spoke 300 extends radially inward and circumferentially in a clockwise direction (when seen form this side). The spoke then curves forming a radiused nose 350. The radially inner portion 325 continues in a radially inward and circumferentially in a counterclockwise direction to hub attachment point 320 which possesses a dovetail thickened portion 310 for engagement with a fastener.

In this embodiment, the spoke's V-shaped geometry allows the spoke 300 to nest with each adjacent spoke 300 on either side of it, preventing the spokes from clashing into each other during normal operating conditions, such as rolling under the normal loading conditions for the wheel. The nesting enables the nose of the spoke to extend circumferentially past a straight line drawn between the connection point of an adjacent spoke with the hub and the connection point of the adjacent spoke with the outer band.

In the embodiment shown here, the spokes 300 are integrally formed with an outer ring 390 which is attached to the outer band 400. Alternatively the spokes may be formed individually and bonded individually with the outer band 400.

Figure 2:
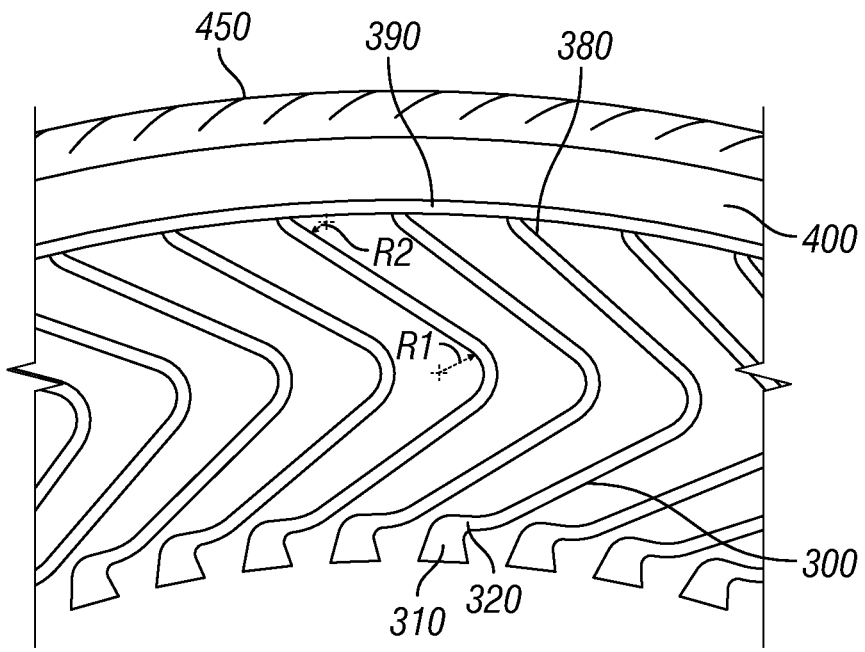
FIG. 2 provides a partial enlarged side view of the outer portion of the non-pneumatic wheel with the spokes in a relaxed neutral state.

FIG. 2 provides a partial enlarged side view of the outer portion of the non-pneumatic wheel 10 with the spokes 300 in a relaxed neutral state. The outer band 400 of the wheel possesses a tread 450. The relaxed neutral state is the position that the spokes would assume when they are disconnected from the hub, or in other words, when the spokes have no pretention or precompression applied to them. The spokes possess a dovetail portion 310 at the radially inner portion of the spoke. The radially inner portion of the spoke extends out in a circumferential direction from the dovetail 310 at the connection point 320 with the dovetail. The spoke extends to a nose portion 350 which possess a radius R1. The radius R1 reduces bending stresses as compared to a sharp v-shaped nose. The spoke then extends from the nose portion 350 to the radially outer connection point 380 which then, after another radiused bend R2, joins to the outer ring 390 which is attached with the outer band 400.

Figure 3:
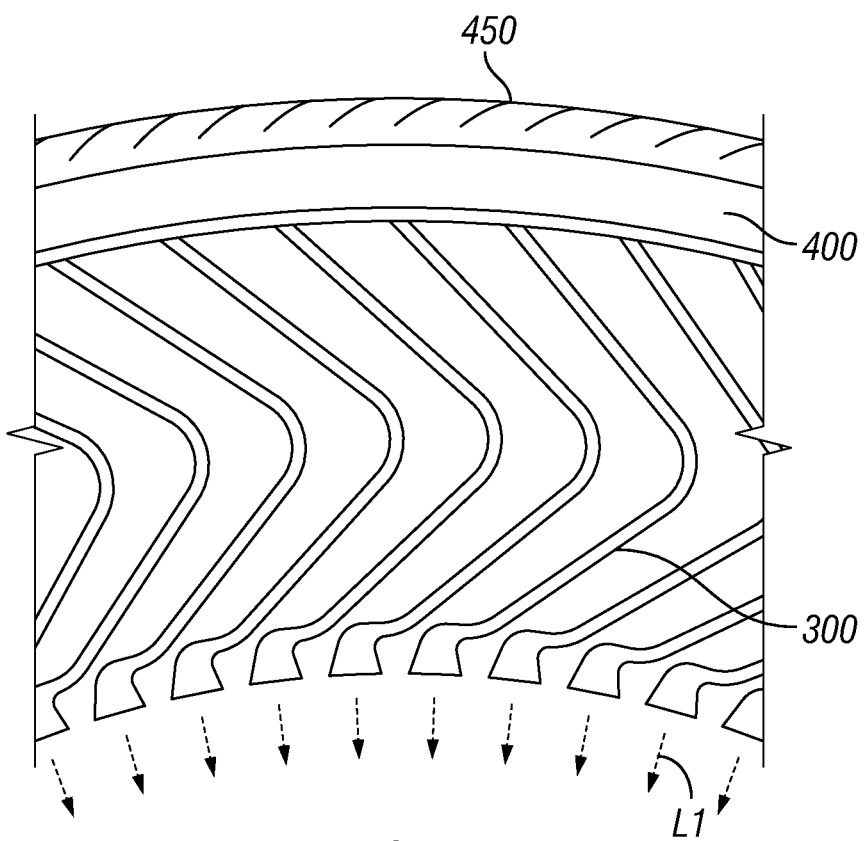
FIG. 3 provides a partial enlarged side view of the outer portion of the non-pneumatic wheel with the spokes in a tensioned state as they would be when connected to the hub portion of the wheel.

FIG. 3 provides a partial enlarged side view of the outer portion of an embodiment of the non-pneumatic wheel wherein the spokes 300 are in a tensioned state as they would be when this embodiment is connected to the hub portion of the wheel. Here a force L1 is applied to the radially inner end of each of the spokes 300 extending the spokes radially inward toward the central axis of the wheel 10. When the spoke 300 is attached to the hub 100, the radial displacement of the spoke creates the pretension L1. In this particular embodiment, the displacement due to pretension is greater than the amount of deflection the wheel undergoes during normal operation in the contact patch. It is anticipated, however, that a dynamic loading event may cause the spoke to momentarily compress past its neutral state.

In an alternative embodiment, the spokes are compressed from a neutral state to a radially compressed state as they would be when the spokes of the alternative embodiment of the wheel are connected to the hub portion of the wheel. In this alternative embodiment, the spokes are under compression even when the wheel is under a normal load and even when considering spokes that are located at the top of the wheel, 180 degrees from the center of the contact patch. It is anticipated, however, that a dynamic loading event may cause a spoke to momentarily undergo tension past its neutral state.

In yet another alternative embodiment, the spokes may be mounted such that they exert compressive forces while in the contact patch, and tensile forces when they are positioned at 180 degrees from the contact patch when the wheel is under normal loading conditions. Such an alternative embodiment may be accomplished if the spokes are mounted to the hub such that they are in a neutral state, neither compressed nor tensioned.

Figure 4:
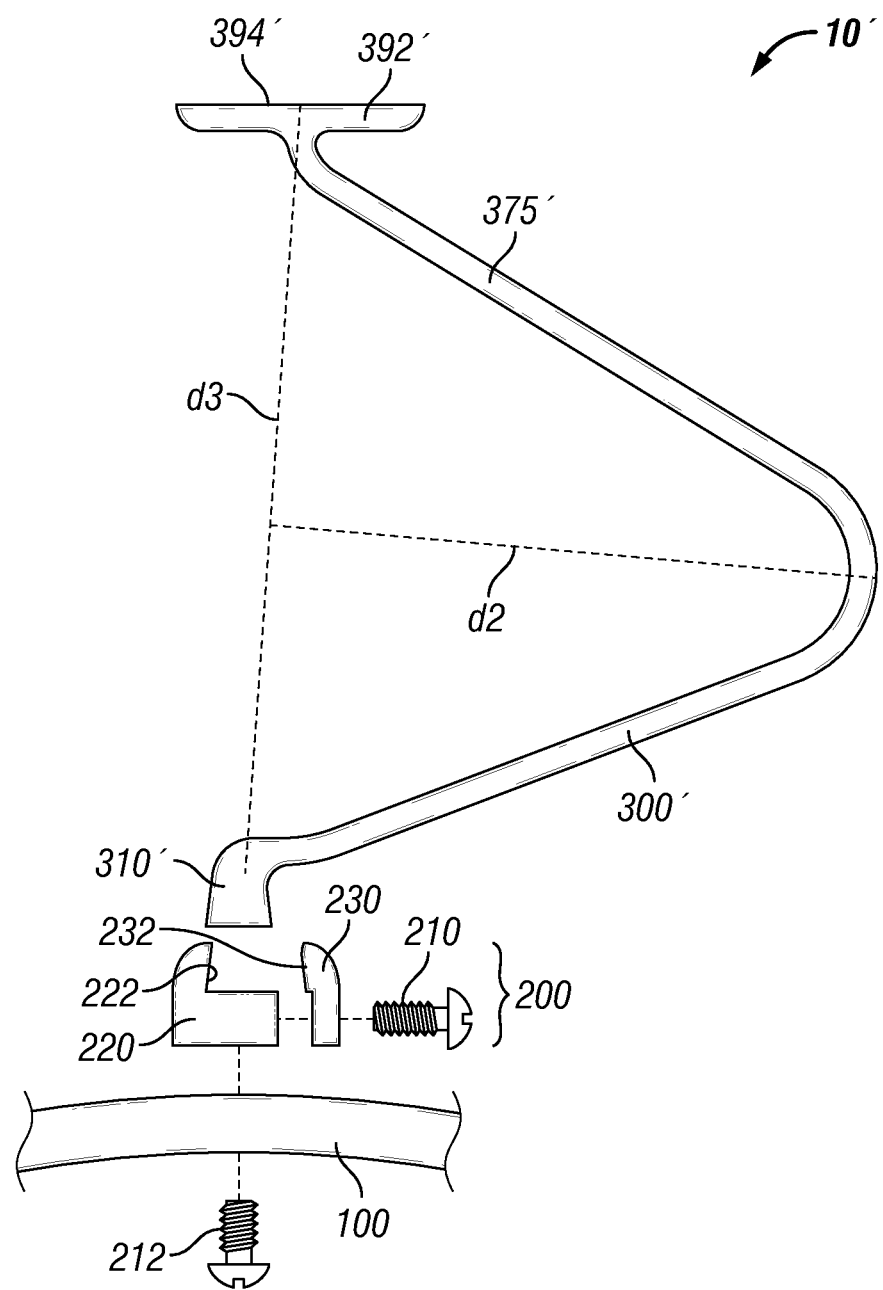
FIG. 4 provides an enlarged partial side view of a single spoke, fastener assembly and a portion of the hub of an embodiment of the non-pneumatic wheel.

FIG. 4 provides an enlarged partial perspective view of another alternative embodiment of a single spoke 300', fastener assembly 200 and a portion of the hub 100 of an embodiment of a non-pneumatic wheel 10'. Here the hub 100 is attached to the spoke 300' by a fastener assembly 200. The fastener assembly creates a slot which clamps on to the dovetail portion 310' of the spoke. The fastener assembly 200 includes an L-shaped bracket 220, a bracket plate 230 and at least one faster 210. Here a plurality of screw fasteners 210 retain the bracket plate 230 onto the L-shaped bracket 220 which impinge the dovetail portion 310' of the spoke 300' by clamping it with the inner surfaces 222, 232 of the bracket.

The radially outer portion 375' of the spoke 300' possesses a T-shaped radially outer end 392' which provides a surface 394' that is attached to the outer band 400. In the embodiment shown, the radially outer surface 394' of the spoke 300' is bonded with an adhesive chosen depending upon the materials used for the outer band and spoke 300'.

Figure 5:
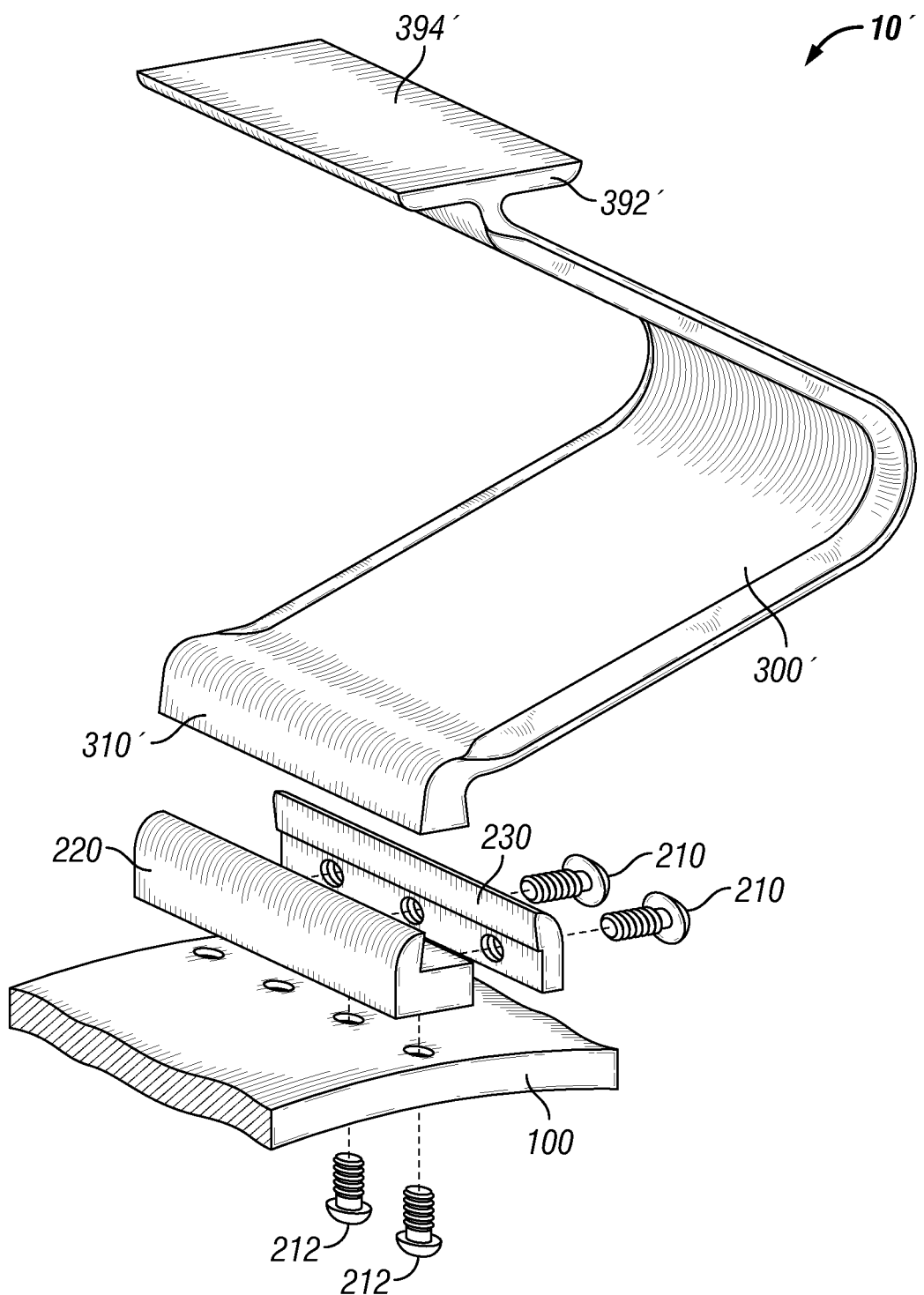
FIG. 5 provides an enlarged partial perspective view of a single spoke, fastener assembly and a portion of the hub of an embodiment of the non-pneumatic wheel.

FIG. 5 provides an enlarged partial perspective view of the single spoke 300', fastener assembly 200 and a portion of the hub 100 of the embodiment of the non-pneumatic wheel 10'. A plurality of fasteners 212 retain the L-shaped bracket 220 to the hub 100. Likewise, a plurality of fasteners 210 retain the bracket plate 230 to the L-shaped bracket 220 and provide impinging force to retain the thickened radially inner end 310' of the spoke 300'. Alternative embodiments, not shown, may possess thickened shapes other than a dovetail or triangular shape as shown for the thickened radially inner end 310', such as a circular shape or rectangular shape. Alternative embodiments may also retain the spoke by sliding the thickened radially inner end 310' of the spoke into a corresponding slot in the hub, the slot being appropriately sized to accommodate and retain the thickened radially inner end of the spoke 300'.

The present embodiment shown in FIG. 4 and FIG. 5 discloses a v-shaped spoke. That is, the spoke possesses a circumferentially elongated curvature that allows the outer band to displace vertically over a greater radial distance without generating as great of a reaction force in the spokes at the top of the wheel than would occur if the spokes were shorter and less curved. In the embodiments shown, the spokes have a circumferential length, as measured from the circumferential distance d2 from a line drawn between the connection to the hub and connection to the outer band to the front of the nose of the spoke which is at least 75 percent of that of the distance of the neutral height d3 of the spoke, the neutral height being measured between the connection point to the hub and the connection to the outer band of the spoke in a neutral, unloaded, state. In the embodiment shown in FIGS. 4 and 5, the circumferential length is at least 80% of that of the uncompressed height of the spoke when measured along a first line as shown from midpoint between the radially outer most points of connection of the hub with the spoke and the midpoint of connection with the outer band of the wheel. The circumferential distance is measured as a second line from that first line to the front of the nose of the spoke. In this particular embodiment, when the spoke is pulled into tension, the circumferential length of the spoke is at least 25% of the tensioned height, when pretension is applied.

In other embodiments, the spoke may have some amount of pre-compression. In such an embodiment, the spoke will transmit more load through compression in the contact region and less through tension in the upper portion of the wheel as compared to a wheel with spoke pretension. An embodiment having spoke pre-compression still allows the spokes to transmit a similar amount of load from the outer band to the hub.

In yet another embodiment, the spoke may be mounted with no pretension or pre-compression. In such an embodiment, the spoke will transmit load in tension at the top of wheel opposite of the contact patch, and will transmit load in compression at the bottom of the wheel in the contact patch. In such an embodiment the spoke surface will be subjected to less static surface stresses. The lack of tensile surface stresses will reduce the spoke vulnerability to ozone attack.

Wheels carrying a greater load in compression will need less spoke stiffness to carry the same load as compared to wheels carrying a greater load in tension. This is due to the larger deflection that occurs in the contact patch than at other locations around the circumference of the wheel when the wheel is loaded.

The ability to mount the spokes with pretension, pre-compression or in a neutral state in the wheel allows for a fine tuning of the contact patch pressure exerted by the wheel. Wheels with spokes under pre-tension will be acting to pull the outer band away from the contact patch, thereby reducing the pressure in the contact patch. Spokes having pre-compression will act to increase the downward pressure when the spokes are compressed in the contact region, increasing the contact patch pressure. Spokes mounted with neutral pre-tension and compression will still push down on the outer band when compressed in the contact region and increase the contact pressure as compared to a pre-tensioned spoke wheel. Since the spoke to outer band force will increase with deflection, the additional contact pressure will also increase with increased deflection. These qualities of the disclosed embodiments allow for a fine tuning of the wheel structure.

By creating the spokes individually, such as shown in the spoke embodiment 300' above, the spokes may be injection molded economically from a variety of alternative materials such as thermoplastic. The material chosen may have a modulus in the range of 1,000 MPa to 3,000 MPa for the embodiments shown. In the particular embodiments shown above in FIG. 4 and FIG. 5 a material having a modulus of 1,200 MPa was found to produce satisfactory results.

The following is an exemplary embodiment: For a 215/45N17 wheel (that is, a 215 mm width, an aspect ratio of the distance between the outer surface of the outer band to the hub of 45% of the wheel's width and a hub diameter of 17 inches, the "N" being used to indicate a non-pneumatic wheel or tire, the spoke would have an neutral height of 56 mm and a circumferential length of 46 mm. The thickness of spokes of this type are generally in the range of 4 mm to 1 mm, with the present exemplary embodiment in the range of 2.4 mm to 1.5 mm. The width of the spoke of this exemplary embodiment is approximately equal to the width of the tire, here, 215 mm. The exemplary embodiment possesses general vertical stiffness characteristics similar to that of a pneumatic wheel of the same dimension, when the pneumatic wheel is inflated to 2.4 bar. One can imagine a variety of ways to build the outer band used in this wheel, including outer bands such as shear bands known in the art. In the end, the outer band used, when combined with the spokes, is selected so as to transmit the vertical load to the ground with a contact patch length indicative of an average contact pressure of 2 to 3 bar.

In the exemplary embodiment, the wheel possesses 80 spokes with each spoke "targeted" to have a stiffness of 15 N/mm (when loaded radially). The spokes are each under the case of "full pre-tension." This means that the spoke should be pre-tensioned by 20 mm when the wheel is being fabricated and the spokes positioned and fastened between the hub and outer band, 20 mm being selected as the amount of deflection the spokes undergo in the contact patch of the wheel under maximum loading conditions.

Figure 6:
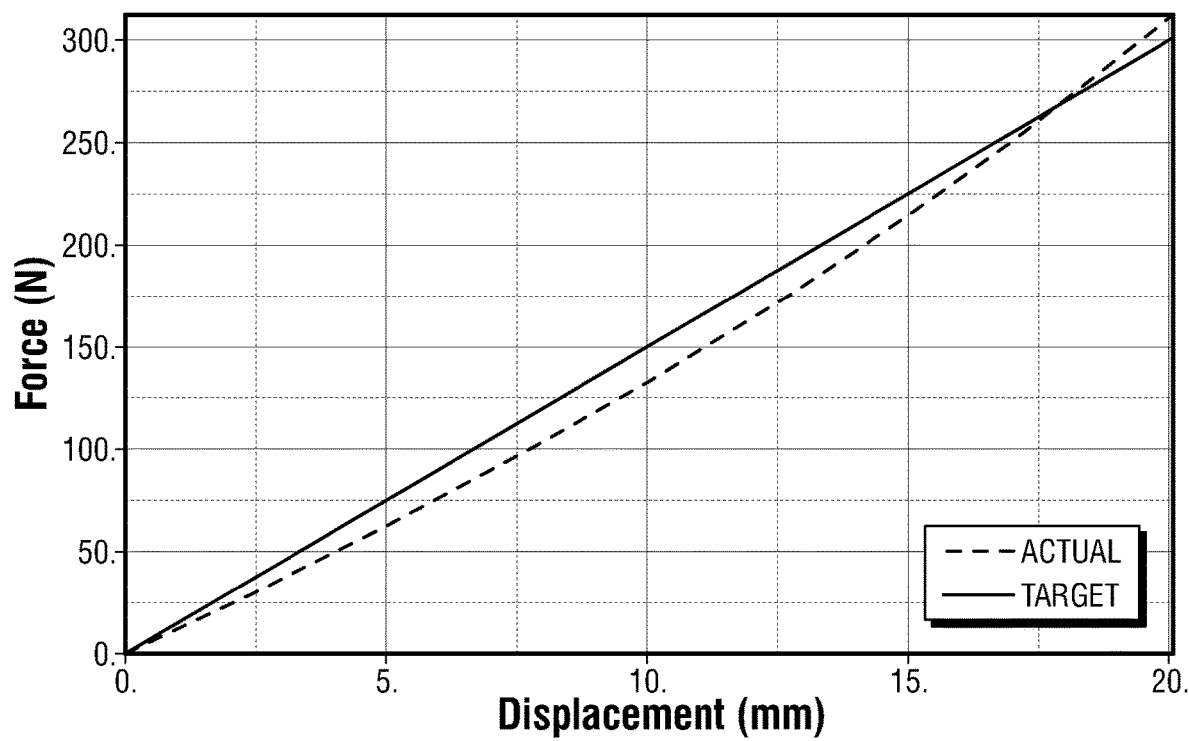
FIG. 6 provides a plot of force versus displacement and a targeted stiffness value of an exemplary embodiment of the invention.

FIG. 6 shows the simulated load vs deflection for the spoke of the exemplary embodiment and a targeted linear stiffness value. The spoke load versus deflection curve is not a straight line as targeted. This acceptable amount of non-linearity is a natural result of the shape of the spoke. As the spoke is straightened, it tends to become stiffer.

If we normalize this stiffness by circumferential angle (the angle in degrees around the axis of rotation of the wheel), we will find that the normalized stiffness (also referred herein as the "fractional radial stiffness value") is 3.33 N/mm/deg in the exemplary embodiment. This value is obtained by multiplying the target spoke stiffness by the number of spokes and dividing by 360 degrees. Thus, if one wanted to design a wheel having similar performance characteristics with 64 spokes instead of 80 spokes, the calculation would be made in reverse to find the target stiffness for an individual spoke from the fractional radial stiffness value. (3.33 N/mm/deg*360 deg/64=18.75 N/mm).

For a typical automotive wheel size (215/45N17) a useful range for the targeted normalized stiffness (fractional radial stiffness value) would be a range from 1 N/mm/deg to 10 N/mm/deg. This range would allow for a variety of spoke designs, outer ring designs and would be useful in a variety of vehicle applications.

Since the spoke load versus deflection behavior would be extremely difficult to achieve in the form of a perfect linear relationship, one should target a range of stiffness and an acceptable linearity of the load versus deflection behavior. A more general and robust method for determining both stiffness and non-linearity could be given by the following method which discloses yet another exemplary embodiment:

A first step to determine the fractional radial stiffness value of the spokes of the wheel and the associated linearity begins with measurement of the load vs. deflection of an individual spoke over its range of use. In this context, "range of use" refers to the nominal range from fully compressed in the center of the contact region to fully extended at the top of the wheel when the wheel is loaded under maximum loading conditions. Once the range of use is determined, the load vs deflection of an individual spoke can be accomplished by removing an individual spoke, clamping or gluing it to appropriate adapting hardware, and measuring the load vs deflection in any one of the many force/deflection testing machines available commercially, such as an Instron Model 5966 over the anticipated range of use.

The force and deflection are plotted over the range of use and a straight line is drawn from the beginning to the end of the curve generated from this data. The slope of this curve will be the "nominal" stiffness of the spoke. Convert that value to a normalized stiffness value (fractional radial stiffness value) using the procedure given above; that is by multiplying by the number of spokes in the wheel and dividing by 360. The fractional radial stiffness value of a wheel of the present invention should fall between 1 N/mm/deg to 10 N/mm/deg to give the desired performance characteristics. In other embodiments, it would be desirable to have a fractional radial stiffness value between 2.0 N/mm/deg to 6.0 N/mm/deg to give the desired performance characteristics. In the other embodiments, the fractional radial stiffness value is between 3.00 N/mm/deg and 3.66 N/mm/deg. In the current exemplary embodiment, the fractional radial stiffness value is 3.33 N/mm/deg.

Figure 7:
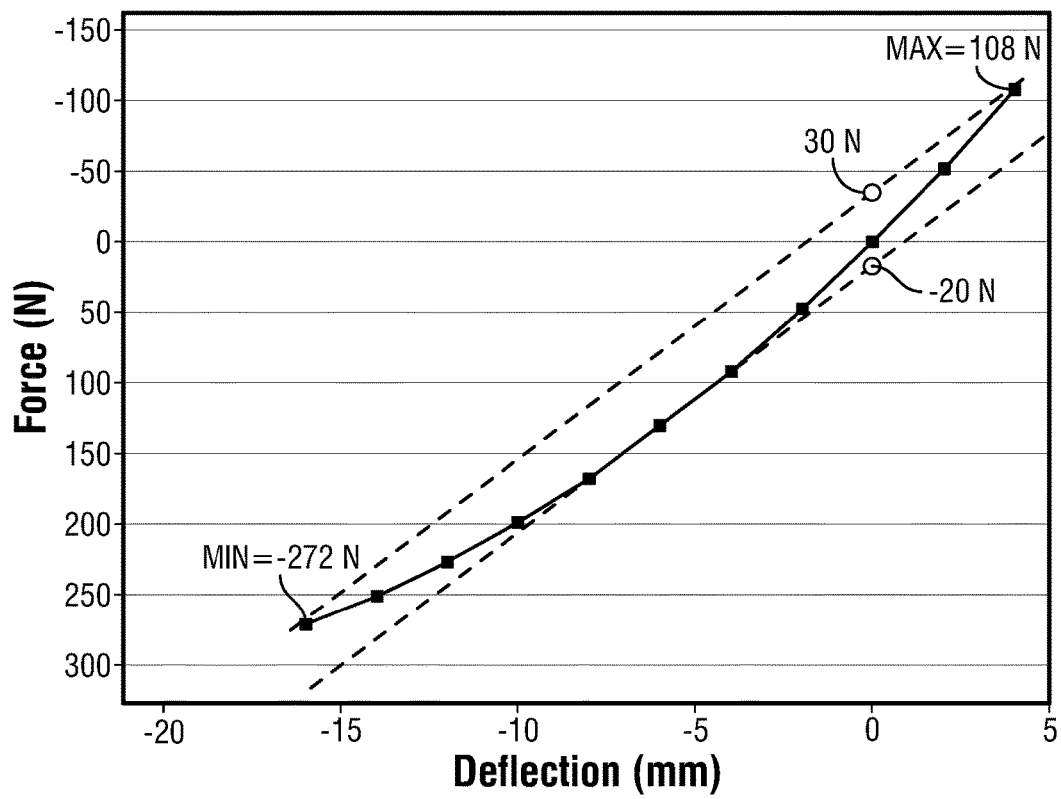
FIG. 7 provides a plot of force versus displacement and a calculated stiffness value and nonlinearity of another exemplary embodiment of the invention.

In order to describe the desired linearity of the curve, using the plot created above of the force/deflection data, a second line is drawn, parallel to the first, that envelopes the entire experimental curve. A third line may be drawn, if necessary parallel to the first should data fall on the other side of the first line opposite of the second line, that is, if the data points can be found on both sides of the first line (not shown) as opposed to only one side of the first line as shown in the example of FIG. 7. The vertical distance (measured in units of force) between the two straight lines will define the non-linearity. In the exemplary embodiment, the nonlinearity should fall within a range of 20% of the full scale range.

An example using this method is given below in FIG. 7. In this example, the spoke is designed to be used between 4 mm of tension and 16 mm of compression for 20 mm of total displacement. In FIG. 7, we see the two parallel lines drawn around the load vs deflection data. The slope of these lines is (108N−(−272N))/20 mm=19 N/mm. The vertical distance between the two bounding lines is 50 N. So the non-linearity value would be 50/380=13% and the normalized slope (stiffness) would be 19 N/mm/spoke*64 spokes/360 deg=3.4 N/mm/deg. A non-pneumatic wheel having these properties produces desirable comfort and handling characteristics.

It should be understood that other web element configurations and geometries may be used within the scope of the invention.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

We claim:

1. A non-pneumatic wheel defining an axis of rotation and defining an axial direction, a radial direction, and a circumferential direction, the non-pneumatic wheel comprising:
   an outer band, an outer surface of the outer band having a ground contacting surface; wherein the outer band forms a contact patch under a normal loading condition;
   a hub; and
   a plurality of spokes;
wherein the non-pneumatic wheel provides an average contact pressure equal to a value in the range of 2 to 4 bar;
wherein each spoke is constructed such that collectively the plurality of spokes exhibit a fractional radial stiffness value within a range of 1 N/mm/deg to 10 N/mm/deg and a non-linearity of less than 20% when deflected under normal loading conditions.

2. The non-pneumatic wheel of claim 1 wherein the average contact pressure is calculated by a total load exerted on the wheel by a vehicle measured in a static state on a flat surface divided by an area within the outer perimeter of the contact patch.

3. The non-pneumatic wheel of claim 1 wherein each spoke has a stiffness and wherein the fractional stiffness is calculated by adding together the stiffness of each spoke and dividing by 360 degrees, where the stiffness of each spoke is calculated by measuring a first force $F_1$ exerted when the spoke is displaced a first displacement $D_1$ equal to that when it is at the center of the contact patch under normal loading conditions, measuring a second force $F_2$ exerted when the spoke is displaced a second displacement $D_2$ equal to that when it is in position at 180 degrees from the center of the contact patch under normal loading conditions, wherein the stiffness of each spoke is equal to $(F_1-F_2)/(D_1-D_2)$ for each spoke.

4. The non-pneumatic wheel of claim 3 wherein the nonlinearity is calculated by plotting a force exerted by each spoke against a displacement of each spoke over a plurality of displacement values from the first displacement $D_1$ to the second displacement $D_2$, plotting a first line between the first displacement, second force value coordinate $(D_1, F_1)$ and the second displacement, second force value coordinate $(D_2, F_2)$ and measuring the maximum deviation of force $(DF_{max})$ from the first line for any given value along the force ordinate, the nonlinearity represented as a percentage, the ratio of $(DF_{max}/(F1-F2))$.

5. The non-pneumatic wheel of claim 1 where each spoke forms a generally radial line between a connection point of the spoke with the hub and a connection point of the spoke with the outer band.

6. The non-pneumatic wheel of claim 1 wherein the plurality of spokes each possess a v-shaped geometry.

7. The non-pneumatic wheel of claim 6 wherein each of the plurality of spokes nest with an adjacent spoke.

8. The non-pneumatic wheel of claim 6 wherein each of the plurality of spokes nest with the adjacent spoke such that a nose of the spoke extends past a vertical line drawn between a connection point of the adjacent spoke with the hub and a connection point of the adjacent spoke with the outer band.

9. The non-pneumatic wheel of claim 1 wherein the normal loading condition is 80% of a maximum loading condition.

10. The non-pneumatic wheel of claim 1 wherein the normal loading condition is a maximum loading condition.

11. The non-pneumatic wheel of claim 1 wherein the spokes are in pre-compression when the wheel is in an unloaded state.

12. The non-pneumatic wheel of claim 1 wherein the spokes are in pre-tension when the wheel is in an unloaded state.

13. The non-pneumatic wheel of claim 1 wherein the spokes are in a neutral state when the wheel is in an unloaded state.

14. The non-pneumatic wheel of claim 1 wherein the fractional radial stiffness value is within a range of 2 N/mm/deg to 6 N/mm/deg.

15. The non-pneumatic wheel of claim 1 wherein the fractional radial stiffness value is within a range of 3 N/mm/deg to 3.66 N/mm/deg.

16. A non-pneumatic wheel defining an axis of rotation and defining an axial direction, a radial direction, and a circumferential direction, the non-pneumatic wheel comprising:
an outer band, an outer surface of the outer band having a ground contacting surface; wherein the outer band forms a contact patch under a normal loading condition;
a hub; and
a plurality of spokes;
wherein the non-pneumatic wheel provides an average contact pressure equal to a value in the range of 2 to 4 bar, the average contact pressure calculated by a total load exerted on the wheel by a vehicle measured in a static state on a flat surface divided by an area within the outer perimeter of the contact patch;
wherein each spoke is constructed such that collectively the plurality of spokes exhibit a fractional radial stiffness value within a range of 1 N/mm/deg to 10 N/mm/deg, wherein each spoke has a stiffness and the fractional stiffness is calculated by adding together the stiffness of each spoke and dividing by 360 degrees, where the stiffness of each spoke is calculated by measuring a first force $F_1$ exerted when the spoke is displaced a first displacement $D_1$ equal to that when it is at the center of the contact patch under normal loading conditions, measuring a second force $F_2$ exerted when the spoke is displaced a second displacement $D_2$ equal to that when it is in position at 180 degrees from the center of the contact patch under normal loading conditions, wherein the stiffness of each spoke is equal to $(F_1-F_2)/(D_1-D_2)$ for each spoke;
wherein each spoke is constructed such that the plurality of spokes exhibit a non-linearity of less than 20% when deflected under normal loading conditions, the nonlinearity calculated by plotting a force exerted by each spoke against a displacement of each spoke over a plurality of displacement values from the first displacement $D_1$ to the second displacement $D_2$, plotting a first line between the first displacement, second force value coordinate $(D_1, F_1)$ and the second displacement, second force value coordinate $(D_2, F_2)$ and measuring the maximum deviation of force $(DF_{max})$ from the first line for any given value along the force ordinate, the nonlinearity represented as a percentage, the ratio of $(DF_{max}/(F1-F2))$.

* * * * *